May 7, 1957 S. FINE ET AL 2,791,751

NON-LINEAR TIME DOMAIN FILTERS

Filed Nov. 23, 1953

INVENTORS
R.E. SCOTT
S. FINE

BY Harry M. Saragovitz
ATTORNEY 2,791,751
Patented May 7, 1957

2,791,751

NON-LINEAR TIME DOMAIN FILTERS

Samuel Fine, Toronto, Ontario, Canada, and Ronald E. Scott, Concord, Mass., assignors to the United States of America as represented by the Secretary of the Army Application November 23, 1953, Serial No. 393,678

5 Claims. (Cl. 333—6)

This invention relates to filters and more particularly to non-linear time domain filters.

It is an object of this invention to provide a filter for separating the signals contained in an input wave composed of a sinusoidal signal and a square wave signal.

Another object of the invention is to separate two signal wave components of a composite wave, one of which is of sinusoidal form and the other of which is a complex non-sinusoidal wave.

In accordance with the invention, in a signal wave translating system including a source supplying a composite wave consisting of a superimposed sinusoidal wave component and a complex non-sinusoidal wave component of relatively high amplitude, a non-linear time domain filter circuit is provided for separating the two wave components. This filter circuit includes means for successively differentiating one energy portion of the composite wave to modify the sinusoidal wave component in phase, and to convert the complex wave component to a wave consisting of a series of narrow pulses of amplitudes which exceed that of the superimposed sinusoidal wave component, and which are separated by relatively long time intervals. The filter circuit also includes means for limiting the resulting differentiated wave in amplitude so as to remove substantially the narrow pulses therefrom; means for successively integrating the amplitude limited wave to reproduce the sinusoidal wave component in its original phase and substantially free from the complex wave component; and means for combining the resulting integrated wave with another energy portion of the original composite wave to reproduce the complex wave component thereof free from the sinusoidal wave component.

Also, in accordance with the invention, the sinusoidal and complex wave components in the composite wave, to be separated, may be separately modulated with signals.

Figure 1:
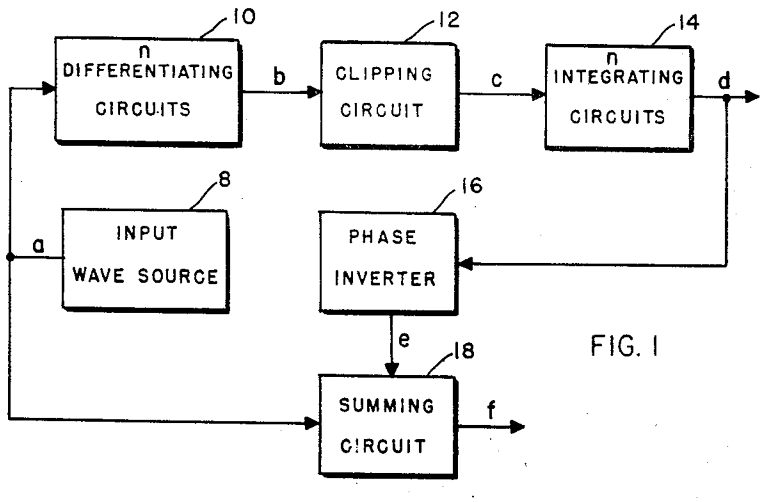
Figure 2:
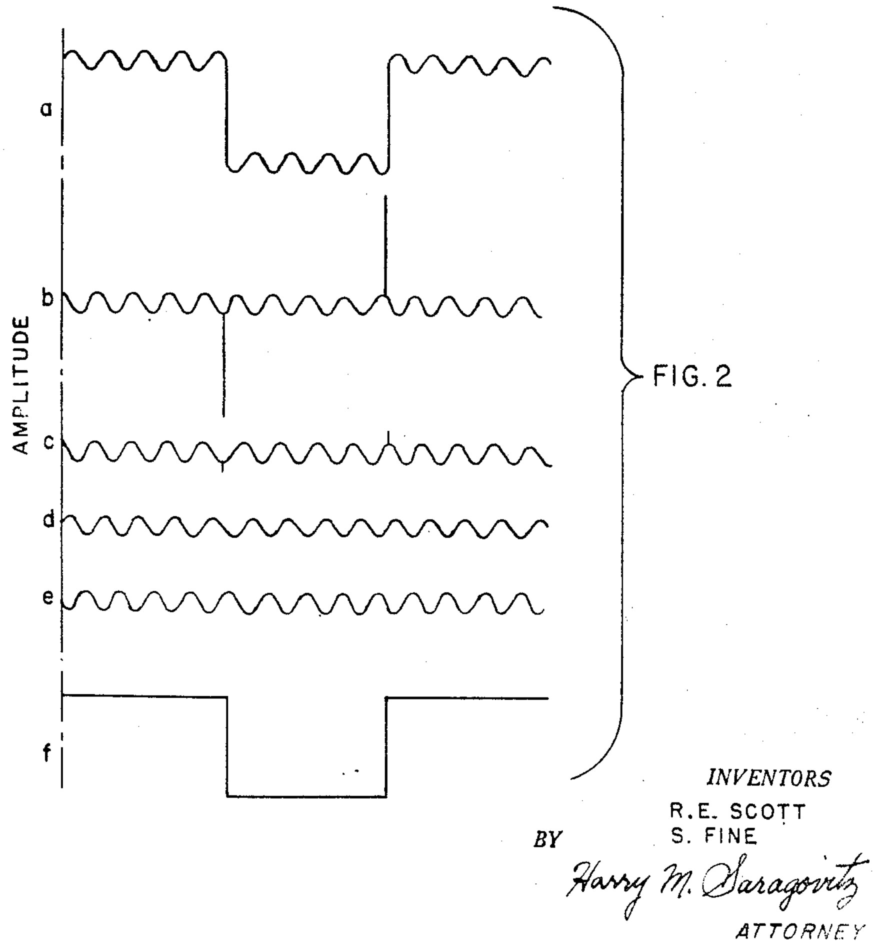

The features of this invention, which are believed to be novel, are set forth with particularity in the appended claims. The invention itself, however, both as to its organization and method of operation together with further advantages thereof, may best be understood by reference to the following description taken in conjunction with the accompanying drawing, wherein:

Fig. 1 illustrates a block diagram of a preferred embodiment of the invention, and Fig. 2 shows a group of graphs which are used to aid in explaining the operation of the invention.

Referring now to Fig. 1, input wave from input wave source 8 is applied to the input of the first of the *n* differentiating circuits 10, where *n* is a positive finite integer. The *n* differentiating circuits are connected in cascade. The output of the last of *n* differentiating circuits 10 is applied to the input of clipping circuit 12. The output of clipping circuit 12 is applied to the input of the first of *n* integrating circuits 14. The *n* integrating circuits are also connected in cascade. A first output signal is obtained from the last of *n* integrating circuits 14. In addition, the output of the last of *n* integrating circuits 14 is connected to the input of phase inverter 16. Phase inverter 16 provides 180° phase inversion, but has no effect on the amplitude of the signal applied thereto. The output of phase inverter 16 and the input wave from input wave source 8 are applied as inputs to summing circuit 18. The second output signal is obtained as the output of summing circuit 18.

The operation of the circuit shown in Fig. 1 will now be considered for the simplest case, where the input wave consists of a single sine wave and a square wave. The wave forms existing at the input and output of the respective blocks, designated *a* to *f* in Fig. 1, are respectively shown in graphs *a* to *f* of Fig. 2. Input wave *a* consists of a superimposed sine wave and square wave. The output *b* of differentiating circuit 10, consists of a sine wave 90° phase displaced from the sine wave of input wave *a*, and a high energy spike at the leading and lagging edges of the square wave of input wave *a*. As shown by output *c*, clipping circuit 12 has no effect on the sine wave of output *b*, but eliminates most of the energy contained in the spikes. As shown in output *d*, integrating circuit 14 brings the sine wave back into phase with the sine wave of input wave *a* and effectively eliminates the small amount of energy contained in the clipped spikes of output *c*, since integrating has the effect of spreading out the energy of the clipped spikes over a long period of time, thereby making the amplitudes thereof negligible. Thus, output *d* is solely the first sinusoidal signal of input wave *a*. Output *e* of phase inverter 16 is equal in amplitude to output *d*, but is 180° out of phase therewith. Summing output *e* and original input wave *a* in summing circuit 18 results in the sine wave being cancelled, so that output *f* of summing circuit 18 is solely the square wave of input wave *a*.

Although the circuit of Fig. 1 has been discussed in detail only for the simple case of a single sine wave and a square wave, it will be seen that the circuit will work equally well if the first signal is composed of more than one sine wave, since differentiating a sinusoidal signal any number of times and then integrating it the same number of times restores the original sinusoidal signal. Further, the second signal may be any signal which can be reduced by differentiation to a square wave. A parabolic wave and a sawtooth or other triangular wave are well-known examples of complex non-sinusoidal waves which can be reduced by differentiation to a square or pulse type wave, and any such wave may be used for the second signal in the composite input wave.

This invention may be used anywhere it is desired to separate signals of the type described. For instance, it could be used in a multiplex receiver with a sine wave which is frequency modulated and a square wave which is pulse width modulated.

While there has been described what is at present considered the preferred embodiment of this invention, it will be obvious to those skilled in the art, that various changes and modifications may be made therein, without departing from the invention, and it is, therefore, intended in the appended claims to cover all such changes and modifications as fall within the true spirit and scope of the invention.

What is claimed is:

1. In a signal wave translating system including a source supplying a composite wave consisting of a superimposed complex wave and a sinusoidal wave of relatively small amplitude, a non-linear time domain filter circuit for separating said complex wave and sinusoidal wave comprising means for successively differentiating said composite wave to produce a differentiated wave wherein said sinusoidal wave is modified in phase and said complex wave is converted to a wave of narrow pulses having amplitudes exceeding the amplitude of said sinusoidal wave, said narrow pulses being separated by relatively long time intervals, means for amplitude limiting said differentiated wave substantially to remove said narrow pulses, means for successively integrating the limited wave to reproduce said sinusoidal wave in its original phase and substantially free from said complex wave and means for combining the integrated wave and said composite wave to reproduce said complex wave free from said sinusoidal wave.

2. In a signal wave translating system including a source supplying a combination signal wave having a superimposed pulse wave component and a sinusoidal wave component of relatively small amplitude, a non-linear time domain filter circuit for separating said wave components comprising means for differentiating said combination wave to produce a differentiated wave wherein said sinusoidal wave component is modified in phase and said pulse wave component is converted to a wave of narrow pulses having amplitudes exceeding the amplitude of said sinusoidal wave component, said narrow pulses being separated by relatively long time intervals, means for amplitude limiting said differentiated wave substantially to remove said narrow pulses, means for integrating the limited wave to reproduce said sinusoidal wave component in its original phase and substantially free from said pulse wave component and means for combining the integrated wave and said combination wave to reproduce said pulse wave component free from said sinusoidal wave component.

3. In a signal wave translating system including a source supplying a composite signal wave consisting of a pulse wave signal and a sinusoidal signal of relatively lower amplitude superimposed, a non-linear time domain filter circuit for separating said pulse wave and sinusoidal signals comprising means for differentiating said composite wave to produce a differentiated signal wave wherein said sinusoidal signal is modified in phase and said pulse wave signal is converted to a wave of narrow pulses having amplitudes exceeding the amplitude of said sinusoidal signal, said narrow pulses being separated by relatively long time intervals, means for amplitude limiting said differentiated signal wave substantially to remove said narrow pulses, means for integrating the limited wave to reproduce said sinusoidal signal in its original phase and substantially free from said pulse wave signal and means for combining the integrated wave and said composite wave to reproduce said pulse wave signal free from said sinusoidal signal.

4. In a signal wave translating system including a source supplying a composite wave consisting of a superimposed pulse wave modulated in accordance with a first signal and a sinusoidal wave, modulated in accordance with a second signal, said pulse wave being of relative high amplitude compared with said sinusoidal wave, a non-linear time domain filter circuit for separating the modulated waves comprising means for differentiating one energy portion of said composite wave to produce a differentiated wave wherein the modulated sinusoidal wave is modified in phase and the modulated pulse wave is converted to a wave of narrow pulses having amplitudes exceeding the amplitude of said sinusoidal wave, said narrow pulses being separated by relatively long time intervals, means for amplitude limiting the differentiated wave substantially to remove said pulses therefrom, means for integrating the limited wave to reproduce the signal modulated sinusoidal wave in its original phase and substantially free from said pulse wave, output means for utilizing one energy portion of the reproduced sinusoidal wave for signaling, means for combining another energy portion of the reproduced sinusoidal wave and a second energy portion of said composite wave to reproduce the signal-modulated pulse wave free from said sinusoidal wave and output means for utilizing the reproduced modulated pulse wave for signaling.

5. The arrangement as defined in claim 4, wherein said sinusoidal wave is frequency modulated in accordance with said second signal.

References Cited in the file of this patent

UNITED STATES PATENTS 2,560,770 Braden ---------------- May 9, 1950